US009207670B2

(12) United States Patent
Rud (10) Patent No.: US 9,207,670 B2
(45) Date of Patent: Dec. 8, 2015

(54) DEGRADING SENSOR DETECTION IMPLEMENTED WITHIN A TRANSMITTER

(75) Inventor: Jason H. Rud, Mayer, MN (US)

(73) Assignee: Rosemount Inc., Eden Prairie, MN (US)

( * ) Notice: Subject to any disclaimer, the term of this patent is extended or adjusted under 35 U.S.C. 154(b) by 614 days.

(21) Appl. No.: 13/236,002

(22) Filed: Sep. 19, 2011

(65) Prior Publication Data

US 2012/0245895 A1 Sep. 27, 2012

Related U.S. Application Data (60) Provisional application No. 61/454,815, filed on Mar. 21, 2011.

(51) Int. Cl.
*G05B 23/02* (2006.01)
*G01D 18/00* (2006.01)

(52) U.S. Cl.
CPC ........... *G05B 23/0221* (2013.01); *G01D 18/00* (2013.01)

(58) Field of Classification Search
CPC .... G05B 23/00; G05B 23/02; G05B 23/0218; G01D 21/02
USPC .................................. 702/15, 116, 127, 183
See application file for complete search history.

(56) References Cited

U.S. PATENT DOCUMENTS

| 3,096,434 | A | 7/1963 | King .............................. 235/151 |
| 3,404,264 | A | 10/1968 | Kugler .......................... 235/194 |
| 3,468,164 | A | 9/1969 | Sutherland ...................... 73/343 |
| 3,590,370 | A | 6/1971 | Fleischer ........................ 324/51 |
| 3,618,592 | A | 11/1971 | Stewart ..................... 128/2.05 R |
| 3,688,190 | A | 8/1972 | Blum ............................ 324/61 R |
| 3,691,842 | A | 9/1972 | Akeley ......................... 73/398 C |
| 3,701,280 | A | 10/1972 | Stroman ......................... 73/194 |
| 3,849,637 | A | 11/1974 | Caruso et al. ................. 235/151 |
| 3,855,858 | A | 12/1974 | Cushing ................... 73/194 EM |
| 3,924,069 | A | 12/1975 | Dildy, Jr. ....................... 375/333 |
| 3,948,098 | A | 4/1976 | Richardson et al. ........ 73/861.24 |
| 3,952,759 | A | 4/1976 | Ottenstein ....................... 137/12 |

(Continued)

FOREIGN PATENT DOCUMENTS

| CA | 999950 | 11/1976 |
| CN | 1185841 | 6/1998 |

(Continued)

OTHER PUBLICATIONS

Summons to attend oral proceeding from the corresponding European Patent Application No. 07838659.6, dated Jan. 29, 2013.

(Continued)

*Primary Examiner* — Mischita Henson
(74) *Attorney, Agent, or Firm* — Westman, Champlin & Koehler, P.A.

(57) ABSTRACT

A process variable transmitter includes a memory that stores a filtered sensor value that is calculated based on a prior received sensor value and a filtered rate of change value that is calculated based on a prior rate of change value. The process variable transmitter also includes a controller that receives a sensor value and compares it to the filtered sensor value to obtain a rate of change value. The controller also compares the rate of change value to the filtered rate of change value to obtain a deviation value, and generates an output indication, such as a sensor failure warning output, based on the deviation value. This is done within the process variable transmitter.

21 Claims, 5 Drawing Sheets

(56) References Cited

U.S. PATENT DOCUMENTS

| | | | |
|---|---|---|---|
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Tsipouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Cameron et al. | 340/870.37 |
| 4,337,516 A | 6/1982 | Murphy et al. | 364/551 |
| 4,383,443 A | 5/1983 | Langdon | 73/290 |
| 4,390,321 A | 6/1983 | Langlois et al. | 417/15 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,446,741 A | 5/1984 | Sirokorad et al. | 73/654 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,705,212 A | 11/1987 | Miller et al. | 236/54 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,833,922 A | 5/1989 | Frick et al. | 73/756 |
| 4,841,286 A | 6/1989 | Kummer | 340/653 |
| 4,853,693 A | 8/1989 | Eaton-Williams | 340/588 |
| 4,866,628 A | 9/1989 | Natarajan | 700/102 |
| 4,873,655 A | 10/1989 | Kondraske | 364/553 |
| 4,907,167 A | 3/1990 | Skeirik | 364/500 |
| 4,924,418 A | 5/1990 | Bachman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,094,109 A | 3/1992 | Dean et al. | 73/718 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,195,098 A | 3/1993 | Johnson et al. | 714/753 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,267,241 A | 11/1993 | Kowal | 714/706 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 376/245 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,549,137 A | 8/1996 | Lenz et al. | 137/486 |

(56) References Cited

U.S. PATENT DOCUMENTS

| | | | |
|---|---|---|---|
| 5,551,306 A | 9/1996 | Scarpa | 73/861.16 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,572,438 A | 11/1996 | Ehlers et al. | 700/295 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,650,943 A | 7/1997 | Powell et al. | 702/51 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,668,322 A | 9/1997 | Broden | 73/756 |
| 5,669,713 A | 9/1997 | Schwartz et al. | 374/1 |
| 5,671,335 A | 9/1997 | Davis et al. | 395/2 |
| 5,672,247 A | 9/1997 | Pangalos et al. | 162/65 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,682,476 A | 10/1997 | Tapperson et al. | 370/225 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/2 |
| 5,705,754 A | 1/1998 | Keita et al. | 73/861.357 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,710,708 A | 1/1998 | Wiegand | 364/470.1 |
| 5,713,668 A | 2/1998 | Lunghofer et al. | 374/179 |
| 5,719,378 A | 2/1998 | Jackson, Jr. et al. | 219/497 |
| 5,731,522 A | 3/1998 | Sittler | 73/708 |
| 5,734,975 A | 3/1998 | Zele et al. | 455/307 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,745,049 A | 4/1998 | Akiyama et al. | |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,539 A | 6/1998 | Rani | 364/557 |
| 5,764,891 A | 6/1998 | Warrior | 395/200.2 |
| 5,781,024 A | 7/1998 | Blomberg et al. | 324/763 |
| 5,781,878 A | 7/1998 | Mizoguchi et al. | 701/109 |
| 5,790,413 A | 8/1998 | Bartusiak et al. | 364/485 |
| 5,796,006 A | 8/1998 | Bellet et al. | 73/661 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,825,664 A | 10/1998 | Warrior et al. | 700/7 |
| 5,828,567 A | 10/1998 | Eryurek et al. | 700/79 |
| 5,829,876 A | 11/1998 | Schwartz et al. | 374/1 |
| 5,848,383 A | 12/1998 | Yuuns | 702/102 |
| 5,854,993 A | 12/1998 | Crichnik | 702/54 |
| 5,854,994 A | 12/1998 | Canada et al. | 702/56 |
| 5,859,964 A | 1/1999 | Wang et al. | 395/185.01 |
| 5,869,772 A | 2/1999 | Storer | 73/861.24 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,900,801 A | 5/1999 | Heagle et al. | 340/286.09 |
| 5,908,990 A | 6/1999 | Cummings | 73/861.22 |
| 5,920,016 A | 7/1999 | Broden | 73/756 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,934,371 A | 8/1999 | Bussear et al. | 166/53 |
| 5,936,514 A | 8/1999 | Anderson et al. | 340/310.01 |
| 5,940,290 A | 8/1999 | Dixon | 364/138 |
| 5,956,663 A | 9/1999 | Eryurek et al. | 702/183 |
| 5,965,819 A | 10/1999 | Piety et al. | 73/660 |
| 5,970,430 A | 10/1999 | Burns et al. | 702/122 |
| 5,995,910 A | 11/1999 | Discenzo | 702/56 |
| 6,002,952 A | 12/1999 | Diab et al. | 600/310 |
| 6,006,338 A | 12/1999 | Longsdorf et al. | 713/340 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 364/148.06 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,041,287 A | 3/2000 | Dister et al. | 702/182 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek et al. | 700/28 |
| 6,047,222 A | 4/2000 | Burns et al. | 700/79 |
| 6,047,244 A * | 4/2000 | Rud, Jr. | 702/98 |
| 6,052,655 A | 4/2000 | Kobayashi et al. | 702/184 |
| 6,059,254 A | 5/2000 | Sundet et al. | 248/678 |
| 6,061,603 A | 5/2000 | Papadopoulos et al. | 700/83 |
| 6,072,150 A | 6/2000 | Sheffer | 219/121.83 |
| 6,094,600 A | 7/2000 | Sharpe, Jr. et al. | 700/19 |
| 6,112,131 A | 8/2000 | Ghorashi et al. | 700/142 |
| 6,119,047 A | 9/2000 | Eryurek et al. | |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | 700/2 |
| 6,195,591 B1 | 2/2001 | Nixon et al. | 700/2 |
| 6,199,018 B1 | 3/2001 | Quist et al. | 702/34 |
| 6,209,048 B1 | 3/2001 | Wolff | 710/62 |
| 6,236,948 B1 | 5/2001 | Eck et al. | 702/45 |
| 6,237,424 B1 | 5/2001 | Salmasi et al. | 73/861.17 |
| 6,260,004 B1 | 7/2001 | Hays et al. | 702/183 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,298,377 B1 | 10/2001 | Hartikainen et al. | 709/223 |
| 6,298,454 B1 | 10/2001 | Schleiss et al. | 714/37 |
| 6,304,828 B1 | 10/2001 | Swanick et al. | 702/107 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyostsia et al. | 702/188 |
| 6,327,914 B1 | 12/2001 | Dutton | 73/861.356 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 9/250 |
| 6,370,448 B1 | 4/2002 | Eryurek et al. | 700/282 |
| 6,377,859 B1 | 4/2002 | Brown et al. | 700/79 |
| 6,378,364 B1 | 4/2002 | Pelletier et al. | 73/152.47 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |
| 6,425,038 B1 | 7/2002 | Sprecher | 710/269 |
| 6,434,504 B1 | 8/2002 | Eryurek et al. | 702/130 |
| 6,449,574 B1 | 9/2002 | Eryurek et al. | 702/99 |
| 6,473,656 B1 | 10/2002 | Langels et al. | 700/17 |
| 6,473,710 B1 | 10/2002 | Eryurek | 702/133 |
| 6,480,793 B1 | 11/2002 | Martin | 702/45 |
| 6,492,921 B1 | 12/2002 | Kunitani et al. | 341/118 |
| 6,493,689 B2 | 12/2002 | Kotoulas et al. | 706/23 |
| 6,497,222 B2 | 12/2002 | Bolz et al. | 123/476 |
| 6,505,517 B1 | 1/2003 | Eryurek et al. | 73/861.08 |
| 6,519,546 B1 | 2/2003 | Eryurek et al. | 702/130 |
| 6,530,259 B1 | 3/2003 | Kelly et al. | 73/23.2 |
| 6,532,392 B1 | 3/2003 | Eryurek et al. | 700/54 |
| 6,539,267 B1 | 3/2003 | Eryurek et al. | 700/51 |

(56) References Cited

U.S. PATENT DOCUMENTS

| | | |
|---|---|---|
| 6,546,814 B1 | 4/2003 | Choe et al. .................. 73/862.08 |
| 6,556,145 B1 | 4/2003 | Kirkpatrick et al. ...... 340/870.17 |
| 6,561,038 B2 | 5/2003 | Gravel et al. ................. 73/729.2 |
| 6,564,268 B1 | 5/2003 | Davis et al. ..................... 710/11 |
| 6,567,006 B1 | 5/2003 | Lander et al. ................. 340/605 |
| 6,594,603 B1 | 7/2003 | Eryurek et al. ............... 702/104 |
| 6,597,997 B2 | 7/2003 | Tingley ........................... 702/34 |
| 6,601,005 B1 | 7/2003 | Kavaklioglu et al. .......... 702/104 |
| 6,611,775 B1 | 8/2003 | Coursolle et al. ............... 702/65 |
| 6,614,271 B1 | 9/2003 | Jin et al. |
| 6,615,149 B1 | 9/2003 | Wehrs ............................. 702/76 |
| 6,637,267 B2 | 10/2003 | Fiebelkorn et al. ............. 73/587 |
| 6,654,697 B1 | 11/2003 | Eryurek et al. ................. 702/47 |
| 6,662,120 B2 | 12/2003 | Drahm et al. ............ 73/861.355 |
| 6,701,274 B1 | 3/2004 | Eryurek et al. ............... 702/140 |
| 6,722,185 B2 | 4/2004 | Lawson et al. ..................... 73/40 |
| 6,727,812 B2 | 4/2004 | Sauler et al. .................. 340/511 |
| 6,738,388 B1 | 5/2004 | Stevenson et al. ............ 370/465 |
| 6,751,560 B1 | 6/2004 | Tingley et al. ................... 702/51 |
| 6,754,601 B1 | 6/2004 | Eryurek et al. ............... 702/104 |
| 6,758,168 B2 | 7/2004 | Koskinen et al. ................. 122/7 |
| 6,859,755 B2 | 2/2005 | Peluso et al. .................. 702/183 |
| 6,904,476 B2 | 6/2005 | Hedtke ............................ 710/72 |
| 6,907,383 B2 | 6/2005 | Eryurek et al. ............... 702/183 |
| 6,915,364 B1 | 7/2005 | Christensen et al. .......... 710/104 |
| 6,970,003 B2 | 11/2005 | Rome et al. ................... 324/718 |
| 6,976,503 B2 | 12/2005 | Ens et al. ...................... 137/552 |
| 6,993,445 B2 | 1/2006 | Clarke et al. .................. 702/106 |
| 7,018,800 B2 | 3/2006 | Huisenga et al. .................. 435/6 |
| 7,036,381 B2 | 5/2006 | Broden et al. ................... 73/708 |
| 7,040,179 B2 | 5/2006 | Drahm et al. ............ 73/861.356 |
| 7,058,542 B2 | 6/2006 | Hauhia et al. ................. 702/183 |
| 7,085,610 B2 | 8/2006 | Eryurek et al. ................. 700/29 |
| 7,099,852 B2 | 8/2006 | Unsworth et al. .............. 706/23 |
| 7,109,883 B2 | 9/2006 | Trimble et al. ........... 340/870.16 |
| 7,114,516 B2 | 10/2006 | Ito .............................. 137/487.5 |
| 7,171,281 B2 | 1/2007 | Weber et al. .................... 700/96 |
| 7,254,518 B2 | 8/2007 | Eryurek et al. ............... 702/183 |
| 7,258,021 B2 | 8/2007 | Broden ............................ 73/756 |
| 7,406,387 B2 | 7/2008 | Hashizume et al. |
| 7,435,581 B2 | 10/2008 | West .......................... 435/289.1 |
| 7,528,737 B2 | 5/2009 | Hedtke |
| 7,577,543 B2 | 8/2009 | Brahmajosyula et al. |
| 7,680,549 B2 | 3/2010 | Kavaklioglu et al. |
| 7,766,541 B2 | 8/2010 | Sato |
| 7,821,437 B1 | 10/2010 | Rud et al. ...................... 341/123 |
| 7,827,988 B2 | 11/2010 | Matthews et al. ........ 128/204.21 |
| 8,311,778 B2 | 11/2012 | Bronczyk et al. ............. 702/188 |
| 8,401,819 B2 | 3/2013 | Kavaklioglu |
| 2002/0013629 A1 | 1/2002 | Nixon et al. |
| 2002/0029808 A1 | 3/2002 | Friend et al. .................. 137/551 |
| 2002/0032544 A1 | 3/2002 | Reid et al. .................... 702/183 |
| 2002/0077711 A1 | 6/2002 | Nixon .............................. 700/19 |
| 2002/0121910 A1 | 9/2002 | Rome et al. ................... 324/718 |
| 2002/0145568 A1 | 10/2002 | Winter .......................... 343/701 |
| 2002/0148644 A1 | 10/2002 | Schultz et al. .................. 175/39 |
| 2002/0194547 A1 | 12/2002 | Christensen et al. ........... 714/43 |
| 2003/0014536 A1 | 1/2003 | Christensen et al. .......... 709/238 |
| 2003/0033040 A1 | 2/2003 | Billings .......................... 700/97 |
| 2003/0045962 A1 | 3/2003 | Eryurek et al. ............... 700/128 |
| 2004/0064203 A1 | 4/2004 | Bornside et al. ................ 700/78 |
| 2004/0128034 A1 | 7/2004 | Lenker et al. ................. 700/282 |
| 2004/0199361 A1 | 10/2004 | Lu et al. ........................ 702/183 |
| 2004/0249583 A1 | 12/2004 | Eryurek et al. ................. 702/47 |
| 2005/0011278 A1 | 1/2005 | Brown et al. ............... 73/861.18 |
| 2005/0072239 A1 | 4/2005 | Longsdorf et al. .............. 73/649 |
| 2005/0117614 A1 | 6/2005 | Xu et al. |
| 2005/0132808 A1 | 6/2005 | Brown et al. .................... 73/592 |
| 2005/0168343 A1 | 8/2005 | Longsdorf et al. ............ 340/664 |
| 2005/0284237 A1 | 12/2005 | Henry et al. ............. 73/861.356 |
| 2006/0075009 A1 | 4/2006 | Lenz et al. .................... 708/160 |
| 2006/0277000 A1 | 12/2006 | Wehrs ........................... 702/183 |
| 2007/0010967 A1 | 1/2007 | Scherr ........................... 702/182 |
| 2007/0010968 A1 | 1/2007 | Longsdorf et al. ............ 702/183 |
| 2008/0033693 A1 | 2/2008 | Andenna et al. |
| 2008/0052039 A1* | 2/2008 | Miller et al. ................... 702/182 |
| 2008/0082294 A1 | 4/2008 | Pihlaja et al. .................. 702/179 |
| 2008/0103629 A1 | 5/2008 | Milanovic et al. |
| 2008/0110459 A1 | 5/2008 | Farbarik .................... 128/204.18 |
| 2008/0208538 A1 | 8/2008 | Visser et al. .................. 702/190 |
| 2009/0121790 A1 | 5/2009 | Brown et al. ................... 330/279 |
| 2009/0309574 A1 | 12/2009 | Goupil et al. ............... 324/76.41 |
| 2010/0011869 A1 | 1/2010 | Klosinski |
| 2010/0177800 A1 | 7/2010 | Rud et al. |
| 2011/0299567 A1 | 12/2011 | Rud et al. |
| 2012/0041704 A1 | 2/2012 | Rovner et al. ................. 702/100 |
| 2012/0051399 A1 | 3/2012 | Rud et al. ...................... 374/185 |
| 2012/0245895 A1 | 9/2012 | Rud |
| 2012/0250781 A1 | 10/2012 | Rud et al. |
| 2013/0046490 A1 | 2/2013 | Arntson et al. |
| 2014/0172349 A1* | 6/2014 | Harle ............................ 702/130 |

FOREIGN PATENT DOCUMENTS

| | | |
|---|---|---|
| CN | 1346435 | 4/2002 |
| CN | 101156119 A | 4/2008 |
| CN | 101206146 | 6/2008 |
| DE | 32 13 866 A1 | 10/1983 |
| DE | 35 03 597 | 7/1986 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 199 47 129 | 4/2001 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 511 553 | 4/1992 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 697 586 A2 | 2/1996 |
| EP | 0 749 057 A1 | 12/1996 |
| EP | 0 825 506 A2 | 7/1997 |
| EP | 0 827 096 A2 | 9/1997 |
| EP | 0 838 768 A2 | 9/1997 |
| EP | 1 022 626 A2 | 10/1997 |
| EP | 0 807 804 A2 | 11/1997 |
| EP | 0 827 096 | 3/1998 |
| EP | 1 058 093 A1 | 5/1999 |
| EP | 0 335 957 B1 | 11/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JO | 9054611 | 2/1997 |
| JP | 56-031573 | 3/1981 |
| JP | 57196619 | 2/1982 |
| JP | 58-129316 | 8/1983 |
| JP | 59-116811 | 7/1984 |
| JP | 59-163520 | 9/1984 |
| JP | 59-176643 | 10/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |

(56) References Cited

FOREIGN PATENT DOCUMENTS

| | | |
|---|---|---|
| JP | 62-30915 | 2/1987 |
| JP | 62-080535 | 4/1987 |
| JP | 62-50901 | 9/1987 |
| JP | 63-169532 | 7/1988 |
| JP | 64-01914 | 1/1989 |
| JP | 64-72699 | 3/1989 |
| JP | 11-87430 | 7/1989 |
| JP | 2-05105 | 1/1990 |
| JP | 3-118424 | 5/1991 |
| JP | 3-229124 | 10/1991 |
| JP | 4-70906 | 3/1992 |
| JP | 05-60596 | 3/1993 |
| JP | 5-122768 | 5/1993 |
| JP | 5-164781 | 6/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 08-114638 | 5/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| JP | 11-505922 | 5/1999 |
| JP | 3139597 | 12/2000 |
| JP | 2001-501754 | 2/2001 |
| JP | 3139597 | 3/2001 |
| JP | 2002-214185 | 7/2002 |
| JP | 2002-538420 U | 11/2002 |
| JP | 2003-503784 | 1/2003 |
| JP | 2004021712 | 1/2004 |
| JP | 2004034112 | 2/2004 |
| JP | 2004-186445 | 7/2004 |
| JP | 09/005092 | 2/2007 |
| JP | 2007-040763 | 2/2007 |
| JP | 2007-507712 | 3/2007 |
| JP | 2008-513879 | 5/2008 |
| RU | 2056506 | 3/1996 |
| RU | 2190267 C2 | 9/2002 |
| RU | 2384837 | 3/2010 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/50851 | 8/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |
| WO | WO 2005/033639 | 4/2005 |
| WO | WO 2005/093531 | 10/2005 |
| WO | WO 2008/039993 | 4/2008 |

OTHER PUBLICATIONS

"Invitation to Pay Additional Fees; Annex to Form PCT/ISA/206—Communication Relating to the Results of the Partial International Search" for PCT/US2012/027409, dated Jun. 19, 2012.

U.S. Appl. No. 09/257,896, Feb. 25, 1999, Eryurek et al.

"A TCP\IP Tutorial" by, Socolofsky et al., Spider Systems Limited, Jan. 1991 pp. 1-23.

"Approval Standards for Explosionproof Electrical Equipment General Requirements", Factory Mutual Research, Cl. No. 3615, Mar. 1989, pp. 1-34.

"Approval Standard Intrinsically Safe Apparatus and Associated Apparatus for Use in Class I, II, and III, Division 1 Hazardous (Classified) Locations", Factory Mutual Research, Cl. No. 3610, Oct. 1988, pp. 1-70.

"Automation On-line" by, Phillips et al., Plant Services, Jul. 1997, pp. 41-45.

"Climb to New Heights by Controlling your PLCs Over the Internet" by, Phillips et al., Intech, Aug. 1998, pp. 50-51.

"CompProcessor for Piezoresistive Sensors" MCA Technologies Inc. (MCA7707), pp. 1-8, prior to Jan. 2009.

"Ethernet emerges as viable, inexpensive fieldbus", Paul G. Schreier, Personal Engineering, Dec. 1997, p. 23-29.

"Ethernet Rules Closed-loop System" by, Eidson et al., Intech, Jun. 1998, pp. 39-42.

"Fieldbus Standard for Use in Industrial Control Systems Part 2: Physical Layer Specification and Service Definition", ISA-S50.Feb. 1992, pp. 1-93.

"Fieldbus Standard for Use in Industrial Control Systems Part 3: Data Link Service Definition", ISA-550.Feb. 1997, Part 3, Aug. 1997, pp. 1-159.

Fieldbus Standard for Use in Industrial Control Systems Part 4: Data Link Protocol Specification, ISA-S50.Feb. 1997, Part 4, Aug. 1997, pp. 1-481.

"Fieldbus Support for Process Analysis" by, Blevins et al., Fisher-Rosemount Systems, Inc., 1995, pp. 121-128.

"Fieldbus Technical Overview Understanding Foundation™ fieldbus technology", Fisher-Rosemount, 1998, pp. 1-23.

"Hypertext Transfer Protocol—HTTP/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internet Technology Adoption into Automation" by, Fondl et al., Automation Business, pp. 1-5, prior to Jan. 2009.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, Oct. 3, 1988, pp. 1-97.

"Is There a Future for Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI and Browser for Embedded Web Devices" by, Tom Williams, pp. 1-2, prior to Jan. 2009.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

(56) References Cited

OTHER PUBLICATIONS

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *COMMUN. STATIS.-SIMULA.*, 1995, pp. 409-437.

"A Knowledge-Based Approach for Detection and Diagnosis of Out-of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*, prior to Jan. 2009.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software-Based Fault-Tolerant Control Design for Improved Power Plant Operation," *IEEE/IFAC Joint Symposium on Computer-Aided Control System Design* Mar. 7-9, 1994 pp. 585-590.

A Standard Interface for Self-Validating Sensors, by M.P. Henry et al., *Report No. QEUL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4, prior to Jan. 2009.

"Application of Neural Computing Paradigms for Signal Validation," by B.R. Upadhyaya et al., *Department of Nuclear Engineering*, pp. 1-18, prior to Jan. 2009.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988.

"Development of a Resistance Thermometer for Use Up to 1600° C", by M.J. de Groot et al., *CAL LAB*, Jul./Aug. 1996, pp. 38-41.

"Survey, Applications, and Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms for Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation—A New Technique for Rapid Prototyping of Digitan Systems—Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture for Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances in Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," *IBM Technical Disclosure Bulletin*, vol. 20, No. 5, pp. 1954 (Oct. 1977).

"A Self-Validating Thermocouple," Janice C-Y et al., *IEEE Transactions on Control Systems Technology*, vol. 5, No. 2, pp. 239-253 (Mar. 1997).

Instrument Engineers' Handbook, Chapter IV entitled "Temperature Measurements," by T.J. Claggett, pp. 266-33, (1982).

(56) References Cited

OTHER PUBLICATIONS

"emWare's Releases EMIT 3.0, Allowing Manufacturers to Internet and Network Enable Devices Royalty Free," 3 pages, PR Newswire (Nov. 4, 1998).
Warrior, J., "The IEEE P1451.1 Object Model Network Independent Interfaces for Sensors and Actuators," pp. 1-14, Rosemount Inc. (1997).
Warrior, J., "The Collision Between the Web and Plant Floor Automation," 6$^{Th}$ WWW Conference Workshop on Embedded Web Technology, Santa Clara, CA (Apr. 7, 1997).
Microsoft Press Computer Dictionary, 3$^{rd}$ Edition, p. 124, prior to Jan. 2009.
"Internal Statistical Quality Control for Quality Monitoring Instruments", by P. Girling et al., *ISA*, 15 pgs., 1999.
Web Pages from www.triant.com (3 pgs.), prior to Jan. 2009.
"Statistical Process Control (Practice Guide Series Book)", *Instrument Society of America*, 1995, pp. 1-58 and 169-204.
"Time-Frequency Analysis of Transient Pressure Signals for a Mechanical Heart Valve Cavitation Study," *ASAIO Jouranl*, by Alex A. Yu et al., vol. 44, No. 5, pp. M475-M479, (Sep.-Oct. 1988).
"Transient Pressure Signals in Mechanical Heart Valve Caviation," by Z.J. Wu et al., pp. M555-M561 (undated).
"Caviation in Pumps, Pipes and Valves," *Process Engineering*, by Dr. Ronald Young, pp. 47 and 49 (Jan. 1990).
"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).
"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).
"Developing Predictive Models for Cavitation Erosion," *Codes and Standards in a Global Environment*, PVP-vol. 259, pp. 189-192 (1993).
"Self-Diagnosing Intelligent Motors: A Key Enabler for Next Generation Manufacturing System," by Fred M. Discenzo et al., pp. 3/1-3/4 (1999).
"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP," by Barretto et al., Computer Networking, pp. 295-304 (1990).
"Computer Simulation of H1 Field Bus Transmission," by Utsumi et al., Advances in Instrumentation and Control, vol. 46, Part 2, pp. 1815-1827 (1991).
"Progress in Fieldbus Developments for Measuring and Control Application," by A. Schwaier, Sensor and Acuators, pp. 115-119 (1991).
"Ein Emulationssystem zur Leistungsanalyse von Feldbussystemen, Teil 1," by R. Hoyer, pp. 335-336 (1991).
"Simulatore Integrato: Controllo su bus di campo," by Barabino et al., Automazione e Strumentazione, pp. 85-91 (Oct. 1993).
"Ein Modulares, verteiltes Diagnose-Expertensystem für die Fehlerdiagnose in lokalen Netzen," by Jürgen M. Schröder, pp. 557-565 (1990).
"Fault Diagnosis of Fieldbus Systems," by Jürgen Quade, pp. 577-581 (Oct. 1992).
"Ziele and Anwendungen von Feldbussystemen," by T. Pfeifer et al., pp. 549-557 (Oct. 1987).
"PROFIBUS Infrastructure Measures," by Tilo Pfeifer et al., pp. 416-419 (Aug. 1991).
"Simulation the Time Behaviour of Fieldbus Systems," by O. Schnelle, pp. 440-442 (1991).
"Modélisation et simulation d'un bus de terrain: FIP," by Song et al, pp. 5-9 (undated).
"Field Bus Networks for Automation Systems Containing Intelligent Functional Unites," by W. Kriesel et al., pp. 486-489 (1987).
"Field Buses for Process Interconnection with Digital Control Systems," Tecnología, pp. 141-147 (1990).
"Decentralised Systems with Real-Time Field Bus," Netzwerke, Jg. Nr.3 v. 14.3, 4 pages (1990).
"Process Measurement and Analysis," by Liptak et al., Instrument Engineers' Handbook, Third Edition, pp. 528-530, (1995).
"Improving Dynamic Performance of Temperature Sensors With Fuzzy Control Techniques," by Wang Lei et al., pp. 872-873 (1992).
"Microsoft Press Computer Dictionary" 2nd Edition, 1994, Microsoft Press. p. 156.
International Search Report from Application No. PCT/US01/40791 with international filed date of May 22, 2001.
International Search Report from Application No. PCT/US01/40782 with international filing date of May 22, 2001.
International Search Report from Application No. PCT/02/14560 with international filing date of May 8, 2002.
International Search Report from Application No. PCT/US02/14934 with international filing date of May 8, 2002.
"On-Line Tool Condition Monitoring System With Wavelet Fuzzy Neural Network," by Li Xiaoli et al., pp. 271-276 (1997).
"Optimal Design of the Coils of an Electromagnetic Flow Meter," by Michalski, A. et al., IEEE Transactions on Magnetics, vol. 34, Issue 5, Part 1, pp. 2563-2566 (1998).
"Magnetic Fluid Flow Meter for Gases," Popa, N.C., IEEE Transactions on Magnetics, vol. 30, Issue 2, Part 1-2, pp. 936-938 (1993).
"New Approach to a Main Error Estimation for Primary Transducer of Electromagnetic Flow Meter," by Michalski, A., IEEE Instrumentation and Measurement Technology Conference Proceedings, vol. 2, pp. 1093-1097 (1998).
"Additional Information From Flowmeters Via Signal Analysis," by Amadi-Echendu, J.E. et al., IEEE Instrumentation and Measurement Technology Conference Record, vol. 7, pp. 187-193 (1990).
International Search Report from Application No. PCT/US02/06606 with international filing date of Mar. 5, 2002.
International Search Report from Application No. PCT/US02/30465 with international filing date of Sep. 25, 2002.
Communication from European patent application No. 07838659.6 dated Jun. 24, 2010.
Communication from EP Application No. 02725990.2-2209, dated Jun. 23, 2008.
U.S. Appl. No. 09/409,098, filed Sep. 30, 1999, Eryurek et al.
U.S. Appl. No. 09/799,824, filed Mar. 5, 2001, Rome et al.
U.S. Appl. No. 09/855,179, filed May 14, 2001, Eryurek et al.
U.S. Appl. No. 09/852,102, filed May 9, 2001, Eryurek et al.
U.S. Appl. No. 09/972,078, filed Oct. 5, 2001, Eryurek et al.
"What is a weighted moving average?", *DAU STAT Refresher*, http://cne.gmu.edu/modules/dau/stat/mvavgs/wma_bdy.html. (1995).
U.S. Appl. No. 10/675,014, filed Sep. 2003, Longsdorf et al.
U.S. Appl. No. 10/744,809, filed Dec. 2003, Brown et al.
"Statistics Glossary: Time Series Data", by Easton et al., http://www.stats.gla.ac.uk/steps/glossary/time_series.html, Sep. 1997.
"The Indicators Story", Sustainable Seattle, pp. 55-59, 1998.
"Detecting Regimes in Temperature Time Series", by Clemins et al., *Artificial Neural Networks in Engineering, Proceedings*, pp. 727-732, 2001.
"Re: Digital Filter-Moving Average", The Math Forumn, http://mathforum.org/discuss/sci.math/a/t/177212, Sep. 28, 1998.
U.S. Appl. No. 10/893,144, filed Jul. 2004, Brown et al.
"Notification of Transmittal of the International Search Report and the Written Opinion of the International Searching Authority", or the Declaration for PCT/US2004/017300.
"Invitation to Pay Additional Fees" for PCT/US2004/031678.
"Notification of Transmittal of the International Search Report or the Declaration", PCT/US2004/025291.
"Notification of Transmittal of the International Search Report or the Declaration", PCT/US2004/031678.
"Notification of Transmittal of the International Search Report or the Declaration", PCT/US2005/011385.
"Notification of Transmittal of the International Preliminary Report on Patenatability", PCT/US2004/031678.
"Notification of Transmittal of International Search Report and the Written Opinion", PCT/US2004/022736.
"Notification of Transmittal of the International Search Report", PCT/US00/14798.

(56) References Cited

OTHER PUBLICATIONS

"Notification of Transmittal of International Search Report and the Written Opinion", PCT/US2006/037535.
"Notification of Transmittal of International Search Report and the Written Opinion", PCT/US2007/012317.
U.S. Appl. No. 10/635,944, filed Aug. 7, 2003, Huisenga et al.
Samson, Technical Information; HART Communication, Part 4 Communications; 40 pp.
"A Supervision Support System for Industrial Processes" by J. Penalva et al., IEEE, Oct. 1993, pp. 57-65.
"International Search Report" for related Application No. PCT/US2007/017301.
"Written Opinion" for related Application No. PCT/US2007/017301.
Office Action from Chinese Application No. 200780030039.6, dated Dec. 1, 2010.
Office Action from European Application No. 07836452.8, dated Jun. 6, 2011.
Office Action from corresponding Japanese Application No. 2009/524611, dated Jul. 26, 2011, 7 pgs.
Office Action from Japanese Application No. 2010-519967, dated Feb. 7, 2012.
Rejection Decision from the corresponding Chinese patent application No. 2007800357356 dated Mar. 28, 2012.
Second Office Action from the corresponding Japanese patent application No. 2009530377 dated May 22, 2012.
Communication dated Nov. 8, 2013 in European Patent Appln. No. 12713813.9-1802. 2 pgs.
International Search Report and Written Opinion for PCT Application No. PCT/US2012/027409, dated Oct. 17, 2012, 18 pages.
Summons to attend oral proceedings from European patent application No. 07838659.6, dated Jan. 29, 2013.
Reexamination Notification from Chinese Application No. 2007800357356, dated May 3, 2013.
Decision of rejection from Japanese patent application No. 2009530377, dated Apr. 30, 2013.
Decision of Rejection from corresponding European patent application No. 07838659.6 dated Jul. 3 2013.
"Notification of Transmittal of the International Search Report and the Written Opinion of the International Searching Authority, or the Declaration" for PCT/US2008/009394 filed Aug. 5, 2008; 13 pages.
Office Action from Japanese Application No. 2010-519967, dated Aug. 9, 2012.
Eryurek et al., "Advanced Diagnostics Achieved with Intelligent Sensors and Fieldbus", 2001, Measuremnet and Control vol. 34, p. 293-311.
Canadian Office Action for Canadian App. No. 2,694,936, dated Oct. 16, 2012.
"Experimental and Numerical Investigation of Turbulent Flow Induced Pipe Vibration in Fully Developed Flow", by Pittard et al., Jul. 2004, Review of Scientific Instruments, vol. 75, No. 7, pp. 2393-2401.
"Wireless Sensing of Flow-Induced Vibrations for Pipeline Integrity Monitoring", by Awawdeh et al., 2006, IEEE, pp. 114-117.
Notification of Transmittal of the International Search Report and the Written Opinion of the International Searching Authority, or the Declaration in related PCT Application No. PCT/US2013/061170, filed Sep. 23, 2013, 9 pgs.
Notification of Transmittal of the International Search Report and the Written Opinion of the International Searching Authority, or the Declaration in related PCT Application No. PCT/US2013/044144, dated Apr. 1, 2014.
"Notification of Transmittal of the International Search Report and the Written Opinion of the International Searching Authority", or the Declaration for PCT/US2012/055733, dated Jul. 3, 2013.
"Basics of Vibration Monitoring for Fault Detection and Process Control", by Reimche et al., Jun. 2-6, 2003, PANANDT 2003, Rio de Janeiro, Brasil, 10 pgs.
"The Effect of Change in Flow Rate on the Vibration of Double-Suction Centrifugal Pumps", by Hodkiewicz et al., 2002, Proceedings of the Institution of Mechanical Engineers, Part E: Journal of Process Mechanical Engineering, vol. 216, pp. 47-58.
Communication pursuant to Rules 161(1) and 162 EPC for European Patent Application No. 12780913.5-1557, dated May 22, 2014, 2 pages.
Official Action from Chinese Patent Application No. 201110303797.9, dated Apr. 22, 2014.
Chinese Office Action dated Apr. 22, 2014 for corresponding Chinese Application No. 201110303797.9, 27 pages.
Office Action from Japanese Application No. 2014-501087, dated Aug. 5, 2014.
"Notification of Transmittal of the International Search Report and the Written Opinion of the International Searching Authority", or the Declaration for PCT/US027409, dated Oct. 17, 2012.
Communication regarding EP Application No. 12713813.9-1802, dated Nov. 8, 2013.
Office Action from Chinese App. No. 201110303797.9, dated Dec. 11, 2014.
Summons to attend Oral Proceedings Pursuant to Rule 115(1) EPC fro European Patent Application No. 07836452.8, dated Oct. 24, 2014.
Office Action from Canadian Patent Application No. 2,838,132, dated Mar. 12, 2015.
Office Action from Russian App. No. 2013146711, dated Feb. 25, 2015.
Office Action from Japanese Application No. 2014-501087, dated May 19, 2015.
Office Action from Chinese App. No. 201110303797.9, dated Jun. 8, 2015.
Office Action from Chinese App. No. 201210335726.1, dated Feb. 25, 2015.
Office Action from Japanese App. No. 2014-533597, dated Mar. 31, 2015.

* cited by examiner

DEGRADING SENSOR DETECTION IMPLEMENTED WITHIN A TRANSMITTER

CROSS-REFERENCE TO RELATED APPLICATION

The present application is based on and claims the benefit of U.S. provisional patent application Ser. No. 61/454,815, filed Mar. 21, 2011, the content of which is hereby incorporated by reference in its entirety.

BACKGROUND

The present disclosure relates to process variable transmitters used in process control and monitoring systems. More specifically, the present disclosure relates to using a component embedded in a transmitter to detect sensor degradation or failure.

Process variable transmitters are used to measure process parameters in a process control monitoring system. Microprocessor-based transmitters often include a sensor, an analog-to-digital converter for converting an output from the sensor into a digital form, a microprocessor for compensating the digitized output, and an output circuit for transmitting the compensated output. Currently, this transmission is normally done over a process control loop, such as a 4-20 milliamp control loop, or wirelessly.

Such process variable transmitters are often connected to a host system by the process control loop. Some current host systems use a statistic, referred to as the Standard Error of the Estimate (Se) statistic, in order to analyze measurement data to predict whether sensors or other process components are failing, before such failures become critical. For instance, some such host systems use the Se statistic to determine whether one of the sensors (such as a thermocouple) is degraded but not yet failing. Other host systems use the Se statistic in order to identify certain process failures (such as reactor runaway) before severe damage occurs. In order to provide this type of information with sufficient accuracy, the conventional Se equation must be updated at least once every second, or more frequently.

More specifically, the Se statistic is used to determine the standard deviation of a sensor signal over a linearization region. This helps to identify how well the data is linearized or how well it is tracking the linearization. One example of the equations used for this statistic are shown below:

$$A = \frac{12 * \sum i(T_i - \overline{T})}{n(n^2 - 1)\Delta t} \quad \text{Eq. 1}$$

$$B = \overline{T} - \frac{A(n+1)\Delta t}{2} \quad \text{Eq. 2}$$

$$\hat{T}_i = Ai\Delta t + B \quad \text{Eq. 3}$$

$$S_e = \sqrt{\frac{\sum (T_i - \hat{T}_i)^2}{(n-2)}} \quad \text{Eq. 4}$$

Where:
n=number of samples (usually 12 to 20)
i=sample number (1 to n)
$\overline{T}_{i=n}$ average inputs
$\hat{T}_i$=calculated input
$T_i$=sampled_inputs
t=update_time
$S_e$=Standard Error of Estimate These equations are resource intensive for embedded microcontroller systems used on many process transmitters. They require a relatively large amount of random access memory for each sensor that is being analyzed. The resolution of the equations is also quite time intensive, and this can reduce the amount of time that is available to process the normal measurement signal input by the sensor.

SUMMARY

A process variable transmitter includes a memory that stores a filtered sensor value that is calculated based on a prior received sensor value and a filtered rate of change value that is calculated based on a prior rate of change value. The process variable transmitter also includes a controller that receives a sensor value and compares it to the filtered sensor value to obtain a rate of change value. The controller also compares the rate of change value to the filtered rate of change value to obtain a deviation value, and generates an indication, which may be a sensor failure warning output, based on the deviation value. This is done within the process variable transmitter.

DETAILED DESCRIPTION

Figure 1:
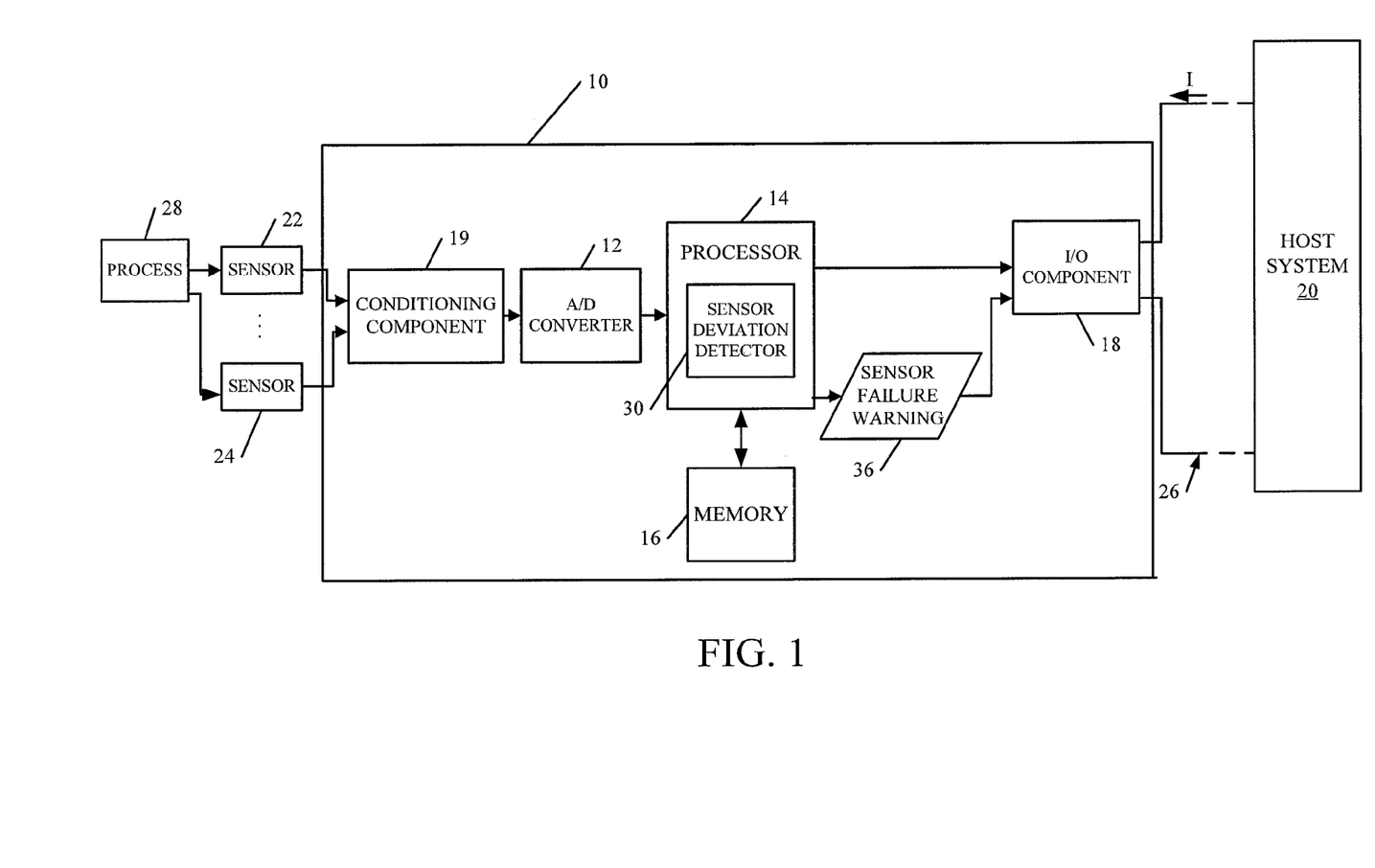
FIG. 1 is a simplified block diagram of a process variable transmitter coupled to a host system and sensors in a process.

FIG. 1 is a simplified block diagram of a transmitter 10 in accordance with one embodiment. Transmitter 10, in the embodiment shown in FIG. 1, includes analog-to-digital (A/D) converter 12, processor 14, memory 16 and input/output (I/O) component 18. Process variable transmitter 10 also illustratively includes conditioning component 19. Transmitter 10 is shown coupled to a plurality of different process variable (PV) sensors 22 and 24. Transmitter 10 is also shown coupled to host system 20 over control loop 26. Of course, transmitter 10 could be connected to a wireless communication link instead of, or in addition to, process control loop 26. In one embodiment, process control loop 26 provides power to transmitter 10.

Sensors 22 and 24 are illustratively process variable sensors that receive inputs from process 28 that is being sensed. For example, sensor 22 may illustratively be a thermocouple that senses temperature and sensor 24 may also be a thermocouple, or a different sensor, such as a flow sensor. Other PV sensors can include a variety of sensors, such as pressure sensors, pH sensors, etc. Sensors 22 and 24 illustratively provide an output that is indicative of a sensed process variable to conditioning component 19.

Conditioning component 19 illustratively conditions the signals received from sensors 22 and 24, such as by amplifying them, linearizing them, etc., and provides them to A/D converter 12. The analog signals provided to A/D converter 12 are thus indicative of the sensed parameters. A/D converter 12 converts the analog signals into digital signals and provides them to processor 14.

In one embodiment, processor 14 is a computer microprocessor or microcontroller that has associated memory 16 and clock circuitry (not shown) and provides information regarding the sensed parameters to I/O component 18. I/O component 18, in turn, provides that information to host system 20 over control loop 26. I/O component 18 can provide the information over control loop 26 either in digital format, or in analog format by controlling current flow (I) through loop 26. In any case, the information related to the sensed parameters is provided over process control loop 26 by transmitter 10.

Figure 2:
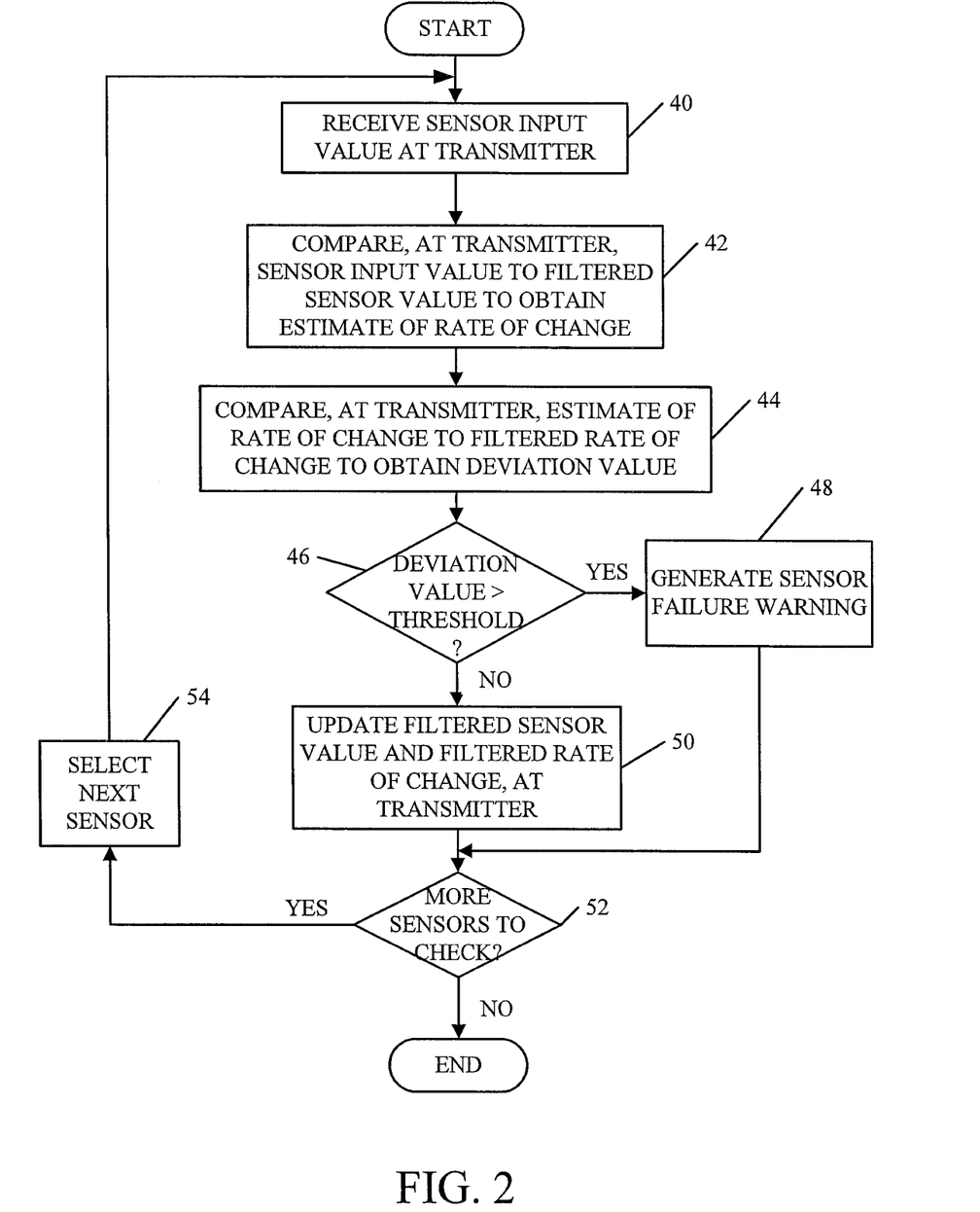
FIG. 2 is a flow diagram illustrating one embodiment of the operation of the system show in FIG. 1.

In the embodiment shown in FIG. 1, processor 14 also includes sensor deviation detector 30. Detector 30 detects statistics related to the sensor signals provided by sensors 22 and 24 and identifies whether sensors 22 and/or 24 are degrading, are failing, or are about to fail. FIG. 2 is a flow diagram illustrating the operation of process variable transmitter 10, and specifically sensor deviation detector 30 in identifying sensors that are failing, or that are about to fail.

As discussed above, some conventional host systems calculated the Standard Error of the Estimate (Se) statistic in order to analyze measurement data in an attempt to identify failing sensors. However, it is believed that this has not been done in a component embedded in transmitter 10. In contrast, sensor deviation detector 30 can process the sensor signals received from A/D converter 12 in order to identify sensors that are degrading, failing or are about to fail. In doing so, sensor 14 first receives the sensor input values from A/D converter 12. This is indicated by block 40 in FIG. 2. Then, instead of calculating the Se value, sensor deviation detector 30 uses a delay operator (or filter) to access memory 16 and compare the incoming data from the sensor to a filtered sensor signal to obtain an estimate of a rate-of-change of the sensor signal. This is done as follows:

$$x = y - \bar{y}_i; \text{ where} \qquad \text{Eq. 5}$$

x is an estimate of the rate of change of the sensor signal;
y is the input signal from the sensor (as digitized by A/D converter 12); and
$\bar{y}_i$ is the average of some number of previous sensor input samples for this given sensor and stored in memory 16.

Comparing the sensor input value (y) to the filtered sensor value ($\bar{y}_i$) to obtain an estimate (x) of the rate of change is indicated by block 42 in FIG. 2.

Sensor deviation detector 30 then accesses memory 16 and performs a similar filtering operation on the estimate (x) of the rate of change obtained in Eq. 5 above, in order to obtain a deviation value as follows:

$$\text{dev} = |x - \bar{x}_i|; \qquad \text{Eq. 6}$$

where $\bar{x}_i$ is the average of some number i of previous rate of change calculations performed for this given sensor and stored in memory 16. Comparing the estimate of the rate of change for the current signal to a filtered rate of change value to obtain the deviation value shown in Eq. 6 is indicated by block 44 in FIG. 2.

Sensor deviation detector 30 then compares the new deviation value (dev) to a threshold value to determine whether the deviation corresponding to the current sensor input is beyond some threshold that would indicate that the sensor is degraded, failing, or is about to fail completely. The specific value for the threshold can be determined empirically, or it can be based on the particular type of sensor being processed. For instance, if the sensor is a thermocouple sensing temperature in a first type of process, then the threshold value may be set to one level, whereas if the sensor is a thermocouple in a different type of process, or if it is a different type of sensor (such as a pH sensor or flow sensor) then the threshold value may be set differently, as desired. Comparing the deviation value to the threshold value is indicated by block 46 in FIG. 2.

If the deviation value exceeds or surpasses the threshold value at block 46, then sensor deviation detector 30 generates an indication of this to the user. In one embodiment, this indication takes the form of a sensor failure warning 36 that is provided to I/O component 18, for transmission to host 20. This is indicated by block 48 in FIG. 2.

However, if, at block 46, it is determined that the deviation value does not surpass the threshold value, then sensor deviation detector 30 updates the filtered sensor value and the filtered rate of change estimate in transmitter 10 and stores those updated values in memory 16. This is indicated by block 50 in FIG. 2.

Processor 14 then determines whether there are more sensors to check. This is indicated by block 52 in FIG. 2. If not, then processing is complete and detector 30 waits until it is time to perform its detection again. However, if, at block 52, it is determined that there are more sensors to check, then a next sensor is selected, as indicated at block 54 in FIG. 2, and processing reverts back to block 40.

It can thus be seen from the above description that sensor deviation detector 30 can detect whether the sensors are failing, by implementing Equations 5 and 6, and this is all done by components embedded within process variable transmitter 10. This is because, instead of using the Se equations which require multiple processes, with each new data point, and which also include averaging, calculating a trend line, evaluating theoretical values from the trend across a number of previously corrected samples, and using complex mathematics such as multiple squares and a square root, sensor deviation detector 30 simply operates by comparing a new sensor input value to a rolling average of prior values, and does the same for the deviation value. This is much less costly in terms of processor overhead and time, yet still provides similar characteristics to those used by host systems to detect sensor failure. Thus, sensor degradation and failure can be detected within process variable transmitter 10, itself, without the need for calculations at host system 20.

Figure 3:
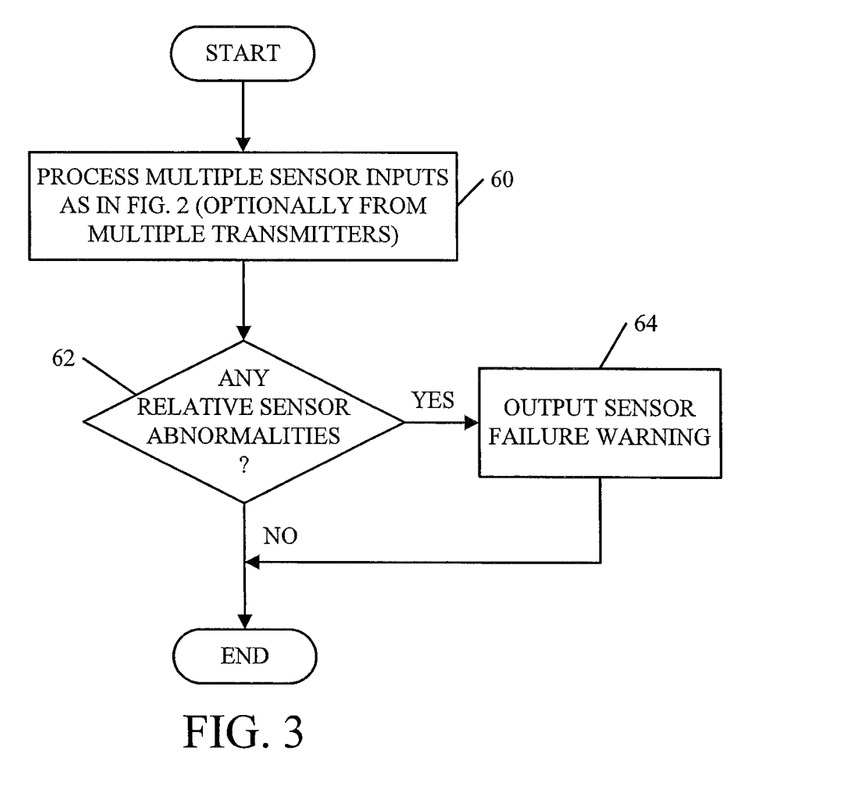
FIG. 3 is a flow diagram illustrating one embodiment of the operation of the system shown in FIG. 1, for multiple sensors.

While FIG. 2 illustrates the operation of the system shown in FIG. 1 for processing sensors on an individual basis, the system can also be used to process inputs from a plurality of different sensors 22 and 24 that either sense variables in process 28 and provide sensor signals to the same process variable transmitter 10, or that provide signals to multiple different process variable transmitters. When receiving signals from multiple different sensors, sensor deviation detector 30 can detect or sense abnormalities by comparing the values from the sensors to an expected relationship among those values. For instance, sensors 22 and 24 are both measuring temperature at different points in process 28, there may be an expected relationship between those two sensor values (such as one being a certain percentage cooler or hotter than the other). Similarly, the values from those sensors can be expected to change in relation to one another according to a given, predetermined, relationship. By way of example, if the sensor signals are expected to be related linearly, and if one of the sensors shows a rapid increase in temperature, but the other does not, then the expected relationship between those two sensors has not been observed, and it may be that one of the sensors is failing, or is about to fail. FIG. 3 is a flow diagram illustrating the operation of the system shown in FIG. 1 in order to perform these types of detections.

Transmitter 10 first receives and processes multiple sensor inputs as shown in FIG. 2. Of course, the sensor inputs can optionally be from multiple different transmitters, or they can be from multiple different processes, or both. Receiving and processing the sensor inputs as discussed above with respect to FIG. 2 is illustrated by block 60 in FIG. 3.

Sensor deviation detector 30 then compares the values obtained by processing as described above with respect to FIG. 2 to determine whether there are any relative sensor abnormalities by comparing the values across the multiple different sensor inputs processed at block 60. This is indicated by block 62 in FIG. 3. If there are sensor abnormalities as determined at block 62, then sensor deviation detector 30 outputs an indication of this (such as sensor failure warning 36) as indicated by block 64. If not, processing is complete.

It should be noted that, in the embodiment shown in FIG. 3, the expected correlation between sensor inputs can be stored in memory 16 and accessed by sensor deviation detector 30 in making the determination as to whether there are any relative sensor abnormalities. The relationship can be stored in memory 16 as an equation, or as a table of values that can be used as a look up table, or in other ways. By way of example only, it may be that transmitter 10 is used on one or more processes where a linear correlation is expected from sensor-to-sensor or from process-to-process. In performing the detection shown in FIG. 3, sensor deviation detector 30 can determine whether there is a relative process or sensor abnormality simply by determining whether the expected linear relationship is observed among the input values. Of course, other relationships can be used as well.

Figure 4:
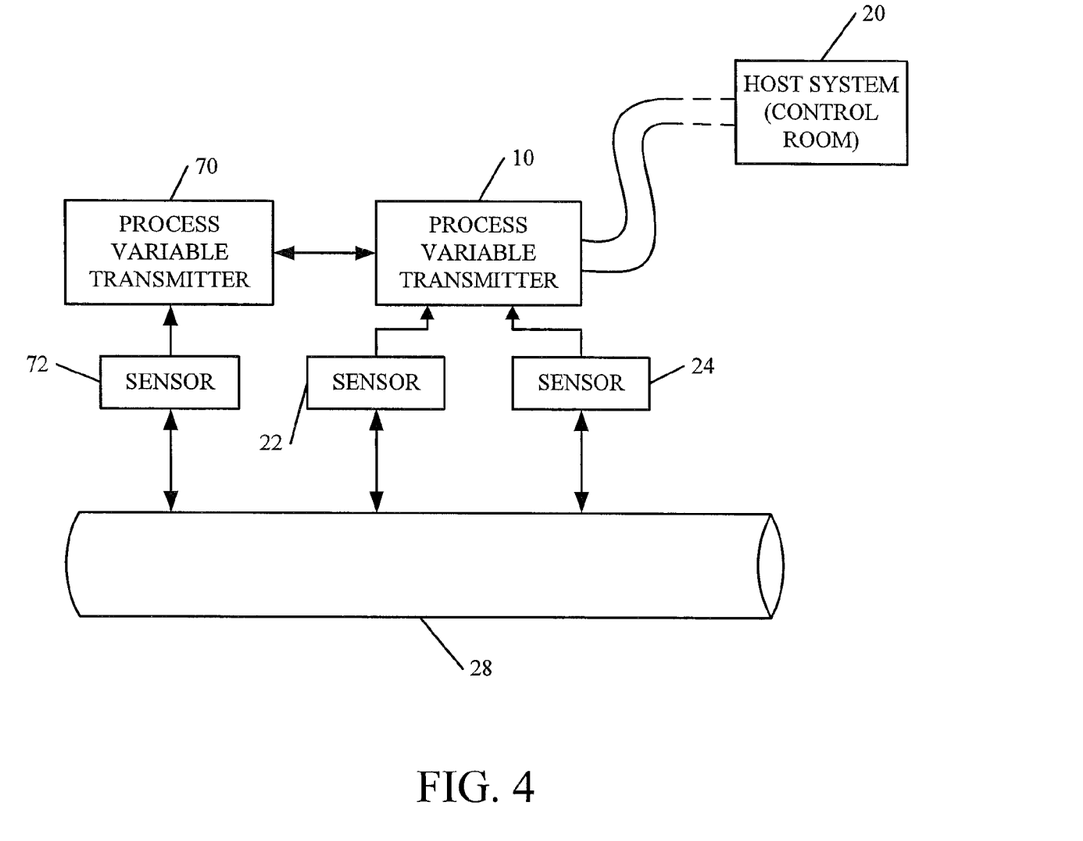
FIG. 4 is a block diagram illustrating one embodiment of multiple processor variable transmitters and multiple sensors.

FIG. 4 is a simplified block diagram showing process variable transmitter 10 along with sensors 22 and 24 and host system 20. FIG. 4 shows that sensors 22 and 24 are sensing process variables in process (or pipe) 28. FIG. 4 shows that an additional process variable transmitter 70, along with another sensor 72, is also disposed to sense a process variable from process (or pipe) 28. Transmitters 10 and 70 are coupled for communications, with one another.

It will be appreciated that using sensor deviation detector 30 to calculate deviations for multiple transmitters or sensor inputs allows detector 30 to calculate process variable velocity and acceleration, so long as the distance between sensors 22, 24, and 72 is known. The distance can be illustratively input into sensor deviation detector 30 by a user configurable entry, or otherwise.

More specifically, when the sensors are connected to the same process 28, at different points, as illustrated in FIG. 4, and the distance between the sensors is known, then sensor deviation detector 30 can detect characteristics on each sensor channel that represent a process variable increase or decrease. When this process variable increase or decrease is seen along two or three (or more) channels, sensor deviation detector 30 can calculate both velocity and acceleration for the process variable. For instance, if sensors 22, 24 and 72 are all temperature sensors, then by processing the signals input from those sensors as described above with respect to FIGS. 2 and/or 3, sensor deviation detector 30 can identify characteristics on each sensor channel that represent a temperature increase or decrease and can thus calculate the velocity and acceleration of the temperature changes in process 28. Similarly, sensor deviation detector 30 can identify peaks or valleys in the input from one sensor channel to the next to identify temperature dissipation or heat loss across process 28 by observing the channel-to-channel differences in the peaks or valleys. Sensor deviation detector 30 can also identify the status of a given sensor channel as deviating from the normal relationship, and thus indicate that the accuracy of the signal on that channel is uncertain.

Figure 5:
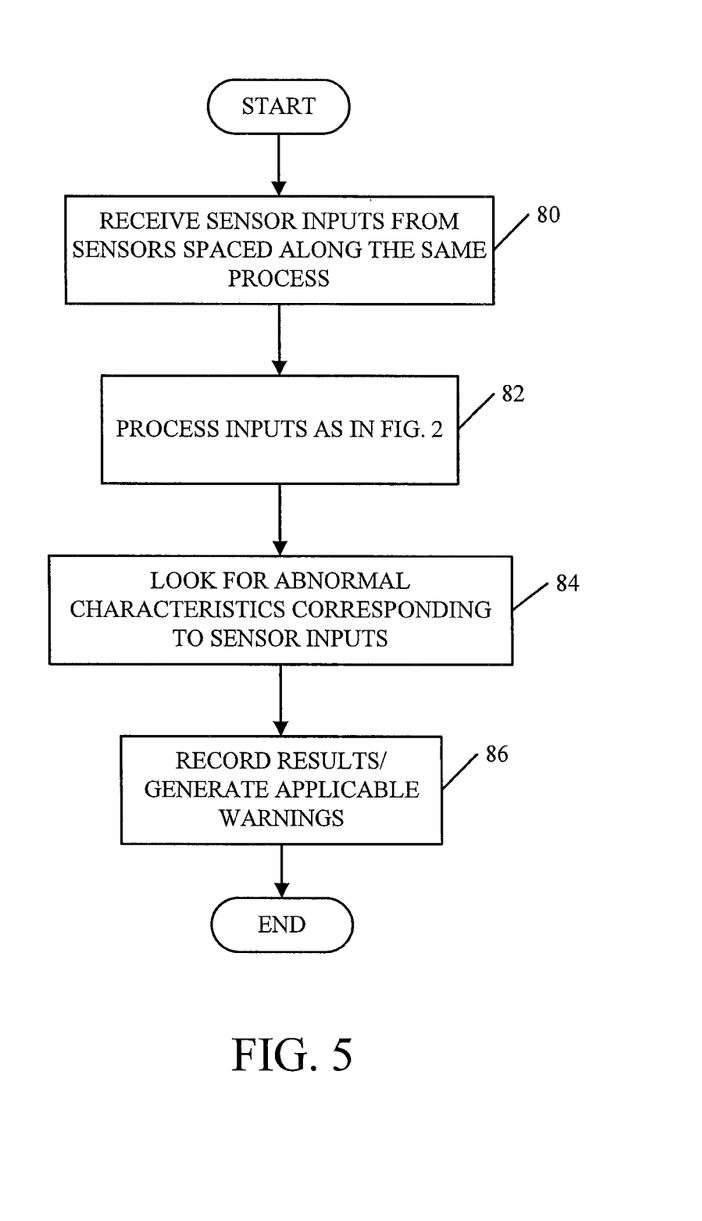
FIG. 5 is a flow diagram illustrating one embodiment of the operation of the system shown in FIG. 4.

FIG. 5 is a flow diagram illustrating the operation of the system shown in FIG. 4 in order to perform these types of calculations. Process variable transmitter 10 first receives sensor inputs from sensors 22, 24, and 72 (via process variable transmitter 70) spaced along the same process 28. This is indicated by block 80 in FIG. 5. Sensor deviation detector 30 in process variable transmitter 10 then processes the sensor inputs as described above with respect to FIG. 2. This is indicated by block 82 in FIG. 5.

Sensor deviation detector 30 then looks for abnormal characteristics corresponding to the sensor inputs. This can be, for example, a deviation from an expected relationship, characteristics corresponding to abnormal velocity and acceleration, characteristics corresponding to abnormal process variable differences (such as temperature dissipation or heat loss) across the process, etc. This is indicated by block 84 in FIG. 5.

Sensor deviation detector 30 then records the results identified in memory 16 and generates any applicable warnings 36. This is indicated by block 86 in FIG. 5.

While the description above has given a number of examples for process variables that can be sensed, it will of course be appreciated that a variety of other process variables can be sensed and processed in substantially the same way. Examples of such other process variables include pressure, level, flow or flow rate, etc.

Although the present disclosure has been described with reference to illustrative embodiments, workers skilled in the art will recognize that changes may be made in form and detail without departing from the spirit and scope of the disclosure.

What is claimed is:

1. A process variable transmitter, comprising:
a sensor sensing a process variable and providing a sensor value indicative of the sensed process variable;
a memory storing a filtered sensor value that is calculated based on an average of a number of previously received sensor values, and a filtered rate of change value that is an average of a number of previously calculated rate of change values, the filtered rate of change values indicating rate of change of previously received sensor values; and
a controller receiving the sensor value from the sensor that senses the process variable, and comparing the sensor value to the filtered sensor value to obtain an estimate of the rate of change value, the controller further comparing the estimate of the rate of change value to the filtered rate of change value to obtain a deviation value, and identifying a sensor characteristic indicative of whether the sensor is operating correctly based on the deviation value.

2. The process variable transmitter of claim 1 and further comprising:
an output component providing an output indication of a sensor failure or degradation warning output to a host system over a communication link.

3. The process variable transmitter of claim 2 wherein the output component provides the sensor failure warning output over a process control loop.

4. The process variable transmitter of claim 2 wherein circuitry of the process variable transmitter is powered with power received from the process control loop.

5. The process variable transmitter of claim 1 wherein the controller calculates the filtered sensor value by generating a rolling average of previously received sensor values.

6. The process variable transmitter of claim 5 wherein the controller generates an updated filtered sensor value based on the sensor value and the filtered sensor value, and stores the updated filtered sensor value as the filtered sensor value in the memory.

7. The process variable transmitter of claim 6 wherein the controller calculates the filtered rate of change value by generating a rolling average of previously calculated rate of change values.

8. The process variable transmitter of claim 7 wherein the controller generates an updated filtered rate of change value based on the rate of change value and the filtered rate of change value and stores the updated filtered rate of change value as the filtered rate of change value in the memory.

9. The process variable transmitter of claim 1 wherein the controller receives a plurality of different sensor values from a plurality of different sensors and obtains a rate of change value corresponding to each of the plurality of sensor values.

10. The process variable transmitter of claim 9 wherein the controller compares characteristics of each of the plurality of sensor values with one another to determine whether the characteristics exhibit an expected relationship to one another.

11. The process variable transmitter of claim 1 wherein the controller compares the sensor value to the filtered sensor value according to an equation:

$$x = y - \bar{y}_i \text{ where}$$

x is an estimate of the rate of change value;
y is the received sensor value
$\bar{y}_i$ is the average of a number I of prior received sensor values; and
wherein the controller obtains the deviation value according to an equation:

$$dev = |x - \bar{x}_i|$$

where $\bar{x}_i$ is an average of the number i of previous rate of change values.

12. A method of identifying characteristics of sensor signals, using a processor in a process variable transmitter, the method comprising:
receiving, at the processor in the process variable transmitter, a sensor value from a sensor that senses a process variable;
comparing, with the processor in the process variable transmitter, the sensor value to a stored sensor value stored in memory in the process variable transmitter, the stored sensor value comprising a rolling average of a plurality of previously received sensor values to determine an estimated rate of change;
determining a deviation value by comparing the determined estimated rate of change and an average of previous rate of change values, the previous rate of change values indicating rate of change of received sensor values;
identifying, with the processor in the process variable transmitter, a sensor characteristic based on the deviation value, indicative of whether the sensor is operating correctly; and
when the sensor is not operating correctly, generating, with the processor in the process variable transmitter, an output indication.

13. The method of claim 12 wherein the comparison generates a rate of change value, and further comprising:
comparing, with the processor in the process variable transmitter, the estimated rate of change value to a stored rate of change value stored in memory in the process variable transmitter, the stored rate of change value being indicative of the average of previous rate of change values; and
wherein identifying comprises identifying, with the processor in the process variable transmitter, the sensor characteristic based on the comparison of the rate of change value to the stored rate of change value.

14. The method of claim 13 wherein the stored rate of change value comprises a first, increasing rate of change value and a second, decreasing rate of change value and wherein comparing the rate of change value to the stored rate of change value comprises:
comparing the rate of change value to both the first and second rate of change values.

15. The method of claim 13 wherein comparing the rate of change value to the stored rate of change value provides a deviation value and wherein identifying the sensor characteristic comprises comparing the deviation value to a stored threshold value.

16. The method of claim 12 wherein receiving comprises:
receiving a sensor value corresponding to each of a plurality of different sensors; and
comparing the sensor values corresponding to the plurality of different sensors, and wherein identifying comprises identifying the sensor characteristic as being indicative of whether the sensor values exhibit an expected relationship relative to one another.

17. The method of claim 16 wherein generating the output indication comprises generating a sensor warning output when the sensor values from the plurality of different sensors fail to exhibit the expected relationship.

18. The method of claim 17 and further comprising:
transmitting the output indication as a sensor warning output to a host system over a process control loop.

19. The method of claim 12 and further comprising:
transmitting the output indication as a sensor warning output to a host system over a wireless communication link.

20. A process variable transmitter, comprising:
a memory storing a predefined sensor relationship indicative of an expected relationship between a rate of change in values from a first sensor and a rate of change in values from at least one second sensor; and
a processor disposed within the process control transmitter, and receiving input sensor values from the first and second sensors, the processor accessing the predefined sensor relationship in the memory to determine whether the input sensor values from the first and at least one second sensor exhibit the expected relationship, and, if not, the controller generating a sensor warning output identifying a sensor characteristic indicative of whether at least one of the first and second sensors are operating correctly.

21. The process variable transmitter of claim 20 wherein the first and at least one second sensors are all disposed to sense one or more process variables on the same process, and wherein the controller receives at least one of the input sensor values from a second process variable transmitter.

* * * * *

UNITED STATES PATENT AND TRADEMARK OFFICE
CERTIFICATE OF CORRECTION

PATENT NO. : 9,207,670 B2  
APPLICATION NO. : 13/236002  
DATED : December 8, 2015  
INVENTOR(S) : Jason H. Rud Page 1 of 1

It is certified that error appears in the above-identified patent and that said Letters Patent is hereby corrected as shown below:

Title Page, item (56)

On Page 4 of the References Cited under FOREIGN PATENT DOCUMENTS:

Delete reference number "JO 9054611" and insert --JP 9054611--

Signed and Sealed this
Twenty-eighth Day of June, 2016

Michelle K. Lee
*Director of the United States Patent and Trademark Office*